Patented Feb. 28, 1950

2,499,247

UNITED STATES PATENT OFFICE 2,499,247

2,13 - DIMETHYLDODECAHYDROPHENAN- THRENE HYDROXY LACTONES AND DE- RIVATIVES THEREOF

Robert P. Jacobsen, Shrewsbury, and Gregory Pincus and Harold Levy, Worcester, Mass., assignors to G. D. Searle & Co., Skokie, Ill., a corporation of Illinois No Drawing. Application October 17, 1947, Serial No. 780,564

10 Claims. (Cl. 260—344.6)

This invention relates to 2,13-dimethyl-polyhydrophenanthrene lactone derivatives of the following type, and to the preparation thereof:

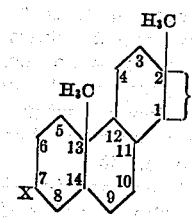

wherein X represents an oxygen function such as a hydroxyl, alkoxyl, aralkoxyl, acyloxyl, or a carbonyl oxygen group; A represents a lactone group of the empirical formula $C_3H_4O_2$, or consists of alcoholic and primary aliphatic acid substituents attached to carbon atoms 1 and 2 having an aggregate empirical formula of $C_3H_6O_3$, which can by simple lactonization form such a group; and wherein there is a double bond located between carbon atoms 9 and 14 when X is a monovalent oxygen function and between carbon atoms 8 and 14 when X is a bivalent oxygen function.

This invention relates also to the salts and esters of the corresponding hydroxy acids obtained by opening the lactone ring.

We have discovered a process for preparing said polyhydrophenanthrene lactones, which comprises the oxidation of dehydroandrosterone derivatives wherein the 3-hydroxyl group and the double bond are suitably protected, which oxidation process involves their reaction with peroxides, peracids, and the like, with or without the presence of an acidic catalyst such as a sulfuric or a sulfonic acid, and which is conducted in a neutral or an acidic medium, preferably consisting of an organic carboxylic acid such as glacial or aqueous acetic acid, and at moderately low temperature for a period of several hours.

Although a preferred scheme for the oxidation process of this invention comprises the reaction of 5,6-dibromo-3(β)-acetoxyandrostane-17 - one, which has the formula

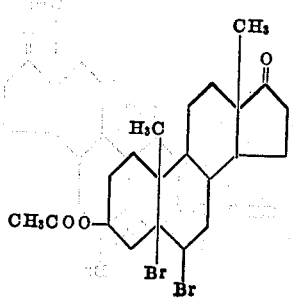

(formed by the bromination of dehydroisoandrosterone acetate in cold carbon tetrachloride) with a large excess of peracetic acid in glacial acetic acid, containing catalytic amounts of p-toluenesulfonic acid, for a period of about 24 hours at at about 35° centigrade, it will be immediately apparent to one skilled in the art that the proportions and concentration of the reactants, as well as the temperature and period of the reaction, may be varied within wide limits, and that the alkane carboxylic acid reaction medium may be replaced by a tertiary alcohol or an inert solvent such as chloroform or carbon tetrachloride. For example, the oxidation may be carried out over a fairly wide range of temperature, varying from about 5° C. to as high as 70° C. At the higher temperatures the oxidation is complete within a few hours, while at 5° C. the reaction may take several days. The oxidizing agent may be hydrogen peroxide, or an aliphatic or aromatic peracid such as peracetic acid, perbenzoic acid, monoperphthalic acid, and mixtures of these agents in inert solvents such as water, alkanoic acids, tertiary alcohols, ethers, hydrocarbons and halogenated hydrocarbons. The oxidizing agents which are suitable for our processes are peroxides and have in common the —O—O— configuration. The catalysts are strong inorganic and organic acids which are not susceptible to oxidation or reduction, and include benzenesulfonic acid, the toluenesulfonic acids, sulfuric acid, phosphoric acid, alkylated sulfuric acids such as ethyl sulfuric acid, methyl sulfuric acid, propyl sulfuric acid and related esters.

We have found it desirable to protect the hydroxyl group of the dehydroisoandrosterone derivatives against oxidation. This is conveniently done by acylation of the hydroxyl radical. Among the acyl groups which are suitable for this purpose are acetyl, propionyl, butyryl and other lower fatty acid radicals, as well as aromatic acid groups such as benzoyl, toluenesulfonyl and the like. The acylation may be carried out by treatment of the steroid with an acid halide or acid anhydride in an acylation medium.

The 3-hydroxyl group may likewise be protected against oxidation by etherification. The 2,13 - dimethyl - polyhydrophenanthrene lactone derivative obtained after oxidation carries at the 7-position an ether group. Among such groups are alkoxyl radicals such as methoxyl, ethoxyl, propoxyl and similar lower alkoxyl groups, and aralkoxyl radicals such as benzyl, phenethyl, naphthylmethyl and the like.

The double bonds of the steroid nucleus must be protected during the oxidative process. This is conveniently done by halogenation of the unsaturated positions with a halogen, such as bromine, or a hydrohalide, according to conventional methods. After the oxidation the product is dehalogenated with reagents such as sodium iodide or zinc dust, or dehydrohalogenated with an organic base such as pyridine.

The alcoholic hydroxyl group at the 7-position of the polyhydrophenanthrene ring can be readily converted to a keto group by oxidation. A preferred procedure involves the use of an aluminum alkoxide, such as aluminum isopropoxide or t-butoxide, and a ketone of high oxidation potential, such as cyclohexanone or acetone, since this process is specific for the oxidation of alcoholic hydroxyl groups to ketones. The 7-hydroxyl group can also be oxidized with oxidizing agents such as chromic anhydride and permanganate. With such agents the unsaturated positions must be protected, as by halogenation.

The carboxyl group of the acids obtained by the opening of the lactone ring may be converted to esters by suitable methods. Warming causes relactonization, which is a special type of esterification, viz., inner-ester formation. Treatment with diazomethane and other diazo hydrocarbons such as phenyldiazomethane results in the formation of the methyl and benzyl and related esters.

The pituitary gland, as the so-called master gland of the body, elaborates and secretes certain hormones which control and stimulate the secretions of certain other glands, including the adrenals, testes and the ovaries. The secondary glands in turn are the source of secretion of various steroid hormones. The ovarian steroid hormones, in addition to controlling phases of the menstrual cycle and organs of the female reproductive system, also act to inhibit certain phases of the activity of the pituitary gland, forming in this way a self-regulating system of physiological balance. At the time of the menopause, secretions of estrogens by the ovaries ceases or diminishes markedly. As a result, secretions of gonadotrophin (the hormone or hormones which stimulate the activity of the gonads to secrete estrogenic hormones) and other hormones by the pituitary often reach excessive levels since they are no longer restrained by the presence of estrogenic hormones. This tends to cause many of the unpleasant and undesirable symptoms frequently associated with the menopause. The administration of estrogenic hormone substances is known to control such symptoms, at least in part through their pituitary inhibition, but it produces undesirable estrogenic effects at the same time. Thus it will be seen that a substance which will effectively inhibit certain pituitary activity and at the same time not produce estrogenic activity is a useful, valuable, and desirable addition to the field of therapeutics. It is an object of this invention to provide such substances.

The androgenic steroid hormones have also been used for the purpose of controlling pituitary gonadotrophin secretion. Thus, testosterone in certain dosages is known to inhibit pituitary hormone secretion. However, the direct androgenic effects of these steroids, such as the induction of beard and other hair growth, voice deepening and so on, is considered most undesirable. The production of substances having the effect on the pituitary without androgenic effect is therefore highly desirable. It is another object of this invention to provide such substances.

Similarly the secretion of pituitary adrenocorticotrophic hormone is affected by the circulating steroid hormones. For example, the administration of certain steroids will inhibit the secretion of adrenocorticotrophin, thereby inhibiting in turn the secretion of adrenal cortex steroid. Substances described in this application also affect adrenocorticotrophin secretion and thereby offer the opportunity to control the activities of the pituitary-adrenal cortex system.

In addition to anterior pituitary inhibition the stimulation of secretion is achieved by certain dosages of certain steroid hormones. In certain hypopituitary conditions these steroid hormones have been used to stimulate the secretory activity of the underfunctioning pituitary. Certain of the substances described in this invention have the property of stimulating pituitary hormone production but lack the androgenic activity of the parent steroids.

The polyhydrophenanthrene lactones and derivatives thereof which comprise this invention are new and useful compositions in the field of therapeutics by virtue of their ability to affect the secretion of hormones by the pituitary gland. More particularly, the new compositions of this invention are uniquely useful and valuable in medicine for the control of certain glandular disorders, because they possess little or no estrogenic or androgenic activity.

The steroid sex hormones, in addition to their specific effects on the sexual and reproductive systems of the body, have other general metabolic effects. Testosterone and other androgens, for example, stimulate protein anabolism in animals and man. This valuable property has found wide therapeutic use. In many cases it would be desirable and often necessary to exert this protein anabolic effect without influencing the sex-stimulating effects. The substances of this invention fulfill this need by virtue of their lack of androgenicity and the presence of such metabolism-stimulating activity. It is to be understood that the utility of the substances described and claimed in this application is not dependent on the mode of action thereof or on the current knowledge and theories relating to physiological processes.

These polyhydrophenanthrene lactones and derivatives thereof may be prepared from suitably constituted 17-keto steroids as specifically disclosed in the following example (quantities of reactants are given in parts by weight). This example is illustrative in nature and is not to be construed as limiting our invention.

*Example*

5 parts of dehydroisoandrosterone acetate in about 100 parts of carbon tetrachloride is treated at about 2–5° C. with 5% in excess of the calculated equimolar quantity of bromine in the same solvent. The resulting acetate dibromide is crystallized from benzene-neohexane and melts at 162.9–163.2° C., with decomposition. It has the formula

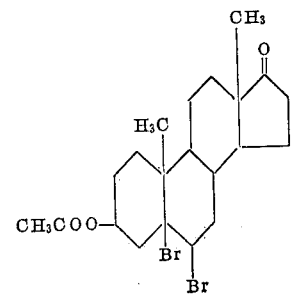

1.5 parts of this material are oxidized with a mixture of 32 parts of 1.25 molar peracetic acid in acetic acid and about 5 parts of glacial acetic acid containing about 0.1 part of p-toluenesulfonic acid for about 24 hours at about 35° C. The lactone acetate dibromide is isolated by dilution of the reaction mixture until crystallization is complete. The purified lactone acetate dibromide ($C_{21}H_{30}O_4Br_2$, M. P. 170.5–170.9° C., dec.) is debrominated by heating with sodium iodide in butanone. The dehydro lactone acetate thus formed melts at 183–185° C. and has the composition $C_{21}H_{30}O_4$. The corresponding dehydro hydroxy lactone ($C_{19}H_{28}O_3$), prepared by saponification followed by relactonization of the above dehydro acetate, melts at 238–242.2° C.

The dehydro hydroxy lactone is oxidized with aluminum isopropoxide and cyclohexanone in refluxing toluene to form the alpha,beta-unsaturated keto lactone ($C_{19}H_{26}O_3$), melting at 205.5–207° C., whose ultraviolet absorption spectrum shows a maximum at 238 m$\mu$, log $\epsilon=4.25$.

We claim:

1. In the process for the production of 2,13-dimethyl-polyhydrophenanthrene lactones having the formula

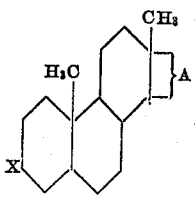

wherein X is an oxygen function of the group consisting of oxo, oxy, and acyloxy radicals, A is a member of the group consisting of a lactone grouping of the empirical formula $C_3H_4O_2$ and the corresponding hydroxyl and aliphatic carboxylic acid substituents having an aggregate empirical formula of $C_3H_6O_3$ derived from said lactone by hydrolysis, and wherein there is a double bond at the one of the positions numbered 8–14 and 14–9, the step which comprises oxidizing a 5,6-dibromo-3($\beta$)-acyloxyandrostan-17-one with a peroxide at a temperature below about 70° C.

2. The process according to claim 1 wherein the oxidization is conducted with an excess of hydrogen peroxide in an acid solution at a temperature below 70° C.

3. The process according to claim 1 wherein the oxidization is conducted with an excess of peracetic acid containing a catalytic amount of p-toluenesulfonic acid at a temperature of about 35° C. for a period of about 24 hours.

4. A new composition of matter having the formula

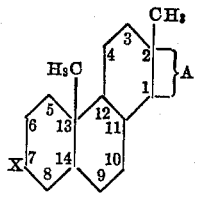

wherein X is an oxygen function of the group consisting of oxo, oxy, and acyloxy radicals, A is a member of the group consisting of a lactone grouping of the empirical formula $C_3H_4O_2$ and the corresponding hydroxyl and aliphatic carboxylic acid substituents having an aggregate empirical formula of $C_3H_6O_3$ derived from said lactone by hydrolysis, and wherein there is a double bond between carbon atoms 9 and 14 when X is a monovalent oxygen function and between carbon atoms 8 and 14 when X is a bivalent oxygen function.

5. A new composition of matter having the formula

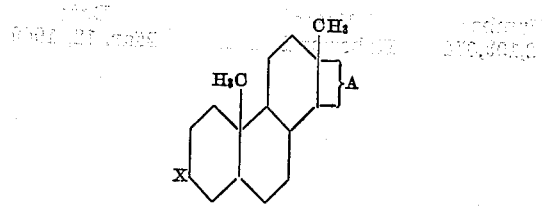

wherein X is an oxygen function of the group consisting of oxo, oxy, and acyloxy radicals, A is lactone grouping of the empirical formula $C_3H_4O_2$ and wherein there is a double bond between carbon atoms 9 and 14 when X is monovalent and between carbon atoms 8 and 14 when X is bivalent.

6. A new composition of matter having the formula

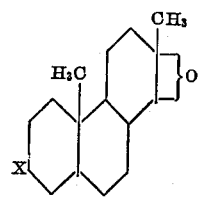

wherein X is an oxygen function of the group consisting of oxo, oxy, and acyloxy radicals, A consists of hydroxyl and primary aliphatic acid substituents having an aggregate empirical formula of $C_3H_6O_3$, and wherein there is a double bond between carbon atoms 9 and 14 when X is monovalent and between carbon atoms 8 and 14 when X is bivalent.

7. A new composition of matter having the formula

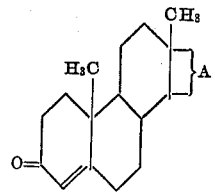

wherein A is a lactone grouping of the empirical formula $C_3H_4O_2$.

8. A new composition of matter having the formula

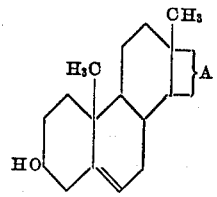

wherein A is a lactone grouping of the empirical formula $C_3H_4O_2$.

9. A compound as in claim 7 having a melting point of 205.5–207° C. and an ultraviolet absorption spectrum with a maximum at 238 m$\mu$; log $\epsilon=4.23$.

10. A compound as in claim 8 having a melting point at 238–242.2° C.

ROBERT P. JACOBSEN.
GREGORY PINCUS.
HAROLD LEVY.

(References on following page)

REFERENCES CITED

The following references are of record in the file of this patent:

UNITED STATES PATENTS

| Number | Name | Date |
|---|---|---|
| 2,193,674 | Haberland | Mar. 12, 1940 |

OTHER REFERENCES

Doisy, Endocrinology, V. 30, 1942, page 936.
Mieschel, Helv. Chim. Acta, V. 27, 1944, pages 1728–29.

Certificate of Correction

Patent No. 2,499,247 February 28, 1950

ROBERT P. JACOBSEN ET AL.

It is hereby certified that errors appear in the printed specification of the above numbered patent requiring correction as follows:

Column 5, line 22, for "4.25" read *4.23*; line 41, for "$C_3H_8O_3$" read *$C_3H_6O_3$*; line 43, strike out the word "the" before "one"; column 6, line 26, extreme right hand portion of the formula, for "O" read *A*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*